US010722786B2

(12) United States Patent
Bellinghausen et al.

(10) Patent No.: US 10,722,786 B2
(45) Date of Patent: Jul. 28, 2020

(54) VIDEO GAME CONTROLLER WITH UNITARY BACK SHELL FOR BUTTON CONTROL AND BATTERY ACCESS

(71) Applicant: VALVE CORPORATION, Bellevue, WA (US)

(72) Inventors: Jeffrey Bellinghausen, Bellevue, WA (US); Claire Michelle Gottschalk, Bellevue, WA (US); Eric Hope, Bellevue, WA (US); Jeffrey Keyzer, Bellevue, WA (US); Scott Dalton, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 15/234,893

(22) Filed: Aug. 11, 2016

(65) Prior Publication Data
US 2019/0118079 A1   Apr. 25, 2019

(51) Int. Cl.
A63F 13/24 (2014.01)
A63F 13/98 (2014.01)

(52) U.S. Cl.
CPC .............. A63F 13/24 (2014.09); A63F 13/98 (2014.09); A63F 2300/1043 (2013.01)

(58) Field of Classification Search
CPC .......................... A63F 13/00; A63F 2300/1006
See application file for complete search history.

(56) References Cited

U.S. PATENT DOCUMENTS

| 5,969,440 A | 10/1999 | Young et al. |
| 5,989,123 A | 11/1999 | Tosaki et al. |
| 6,362,813 B1 | 3/2002 | Worn et al. |
| 6,394,906 B1 | 5/2002 | Ogata |
| 6,760,013 B2 | 7/2004 | Willner et al. |
| 7,859,514 B1 | 12/2010 | Park |
| 8,641,525 B2 | 2/2014 | Burgess et al. |
| 9,089,770 B2 | 7/2015 | Burgess et al. |
| 9,289,688 B2 | 3/2016 | Burgess et al. |
| 9,352,229 B2 | 5/2016 | Burgess et al. |
| 2007/0036372 A1* | 2/2007 | Vonlanthen .......... H04R 25/602 381/312 |
| 2008/0179412 A1 | 7/2008 | Rhodes |
| 2010/0073283 A1 | 3/2010 | Enright |

(Continued)

OTHER PUBLICATIONS

Final Office Action for U.S. Appl. No. 15/630,081, dated Apr. 5, 2019, Campbell, "Hand Held Controller with a back shell and underlying force sensitive resistors", 9 pages.

(Continued)

Primary Examiner — Damon J Pierce
(74) Attorney, Agent, or Firm — Lee & Hayes, P.C.

(57) ABSTRACT

A hand-held video game controller includes a controller body having a front and a back, with at least one front control on the front of the controller body. A removable and resilient unitary back shell is removably attached to the back of the controller body. At least one back control button underlies the unitary back shell, and is depressible by flexing of the unitary back shell into contact with that back control button. At least one battery compartment may underlie the unitary back shell, and may be accessible by removal of the removable unitary back shell.

20 Claims, 5 Drawing Sheets

(56) References Cited

U.S. PATENT DOCUMENTS

| | | | |
|---|---|---|---|
| 2010/0298053 A1* | 11/2010 | Kotkin | A63F 13/24 |
| | | | 3/24 |
| 2013/0281213 A1 | 10/2013 | Yasuda et al. | |
| 2014/0323220 A1* | 10/2014 | Lee | A63F 13/00 |
| | | | 463/37 |
| 2015/0238855 A1 | 8/2015 | Uy et al. | |
| 2015/0283458 A1* | 10/2015 | Burgess | A63F 13/02 |
| | | | 463/37 |
| 2016/0089601 A1* | 3/2016 | Terry | A63F 13/285 |
| | | | 463/37 |
| 2016/0349885 A1 | 12/2016 | Kang, II | |
| 2017/0180523 A1 | 6/2017 | Fernandes et al. | |
| 2017/0189800 A1 | 7/2017 | Crain | |
| 2019/0118080 A1 | 4/2019 | Campbell et al. | |

OTHER PUBLICATIONS

"Rapid Fire Mod for Wireless Xbox 360 Controller," retrieved on Apr. 22, 2016 from <<https://www.google.com/search?rlz=1C1GCEU_enUS819US819&q=phl+hr+420+%22Rapid+Fire+Mod+for+Wireless+Xbox+360+Controller%22&spell=1&sa=X&ved=0ahUKEwjepJ638ebfAhXLzIQKHUhdCdMQBQgpKAA&biw=2133&bih=1210>>, postings Mar. 9, 2008 to Jul. 13, 2008, 16 pages.
Office Action for U.S. Appl. No. 15/630,081 dated Jul. 17, 2018, "Hand Held Controller with a Back Shell and Underlying Force Sensitive Resistors" Campbell, 13 pages.

* cited by examiner

VIDEO GAME CONTROLLER WITH UNITARY BACK SHELL FOR BUTTON CONTROL AND BATTERY ACCESS

BACKGROUND

The video game industry has become large and important, and has spawned many innovations in both software and related hardware. Various hand-held video controllers have been designed, manufactured, and sold, for a variety of game applications. For example, numerous patents have issued on purportedly advantageous button configurations for video game controllers. Some video game controllers are connected to other game hardware by a cable, and hence do not require their own power supply. Other video game controllers establish a wireless connection with other game hardware, and so require batteries. Hence, there is a need in the art for an improved wireless video game controller design that may better facilitate user operation and battery replacement.

DETAILED DESCRIPTION OF EXAMPLE EMBODIMENTS

Figure 1:
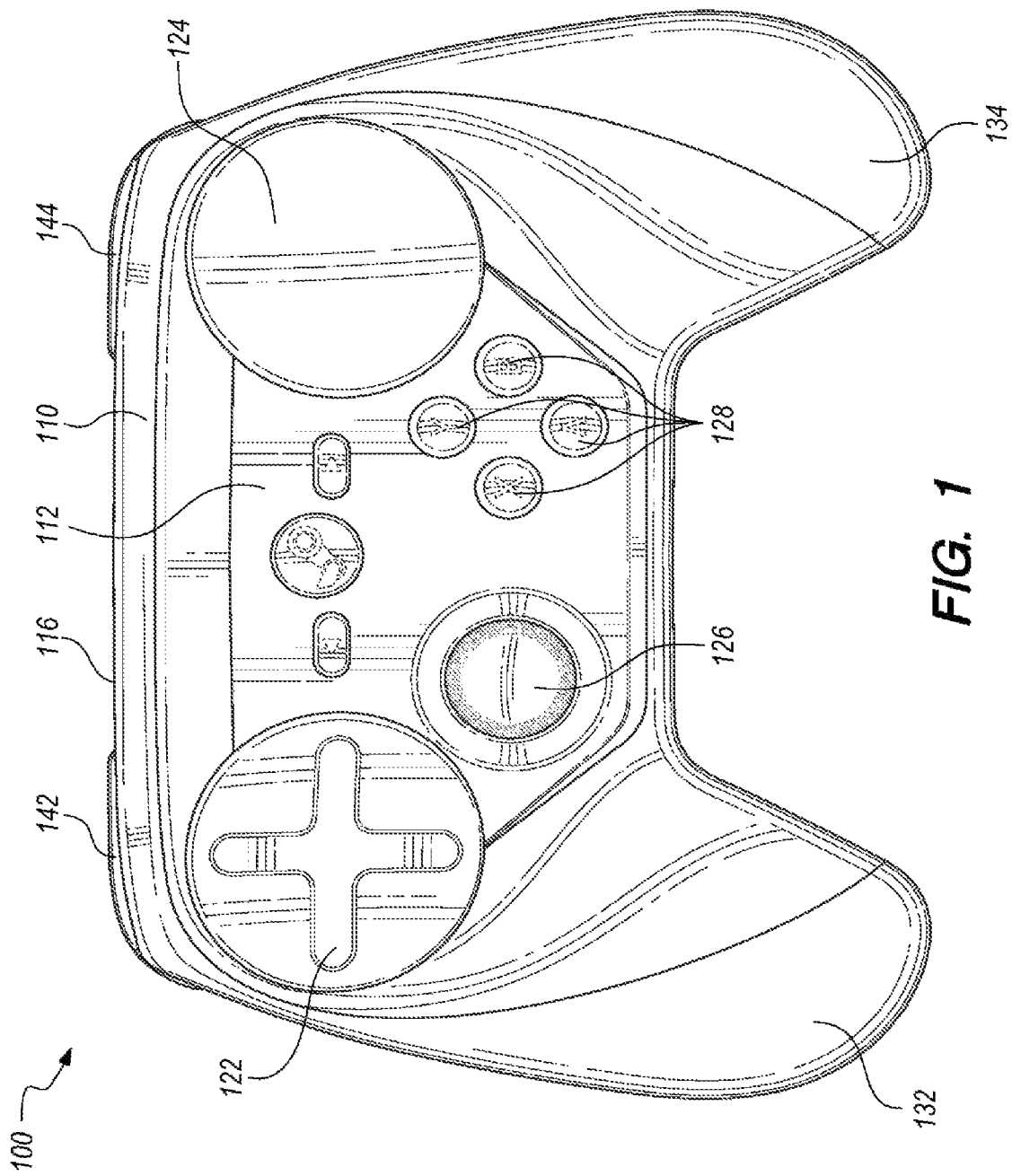
FIG. 1 is a front view of a hand-held video game controller according to an embodiment of the present invention.

FIG. 1 is a front view of a hand-held video game controller 100 according to an embodiment of the present invention. The controller 100 may include a controller body 110 having a front 112 and a back (not visible in FIG. 1). In the embodiment of FIG. 1, the front 112 of the controller body 110 may include a plurality of thumb controls 122, 124, 126, 128. For example, tilting button controls 122, 124, a joystick 126, each of the buttons 128, and any other button, knob, wheel, joystick, or trackball on the front 112 of the controller body 110, may be considered as a thumb control if it may be conveniently manipulated by a user's thumb during normal operation while the controller 100 is held in the hands of the user.

As shown in the example of FIG. 1, the controller 100 may also have an optional left upper trigger 142 and an optional right upper trigger 144, each located along a top edge 116 of the controller body 110, and typically controlled by the user's index fingers during normal operation while the controller 100 is held in the hands of the user. In certain embodiments, the controller body 110 may include a left handle portion 132 and a right handle portion 134, to facilitate handling by the user. In certain embodiments, the left and right handle portions 132, 134 may optionally be simply the left and right edges of the controller body 110 (if that's where the user would normally place her hands during normal use of the controller 100).

Figure 2:
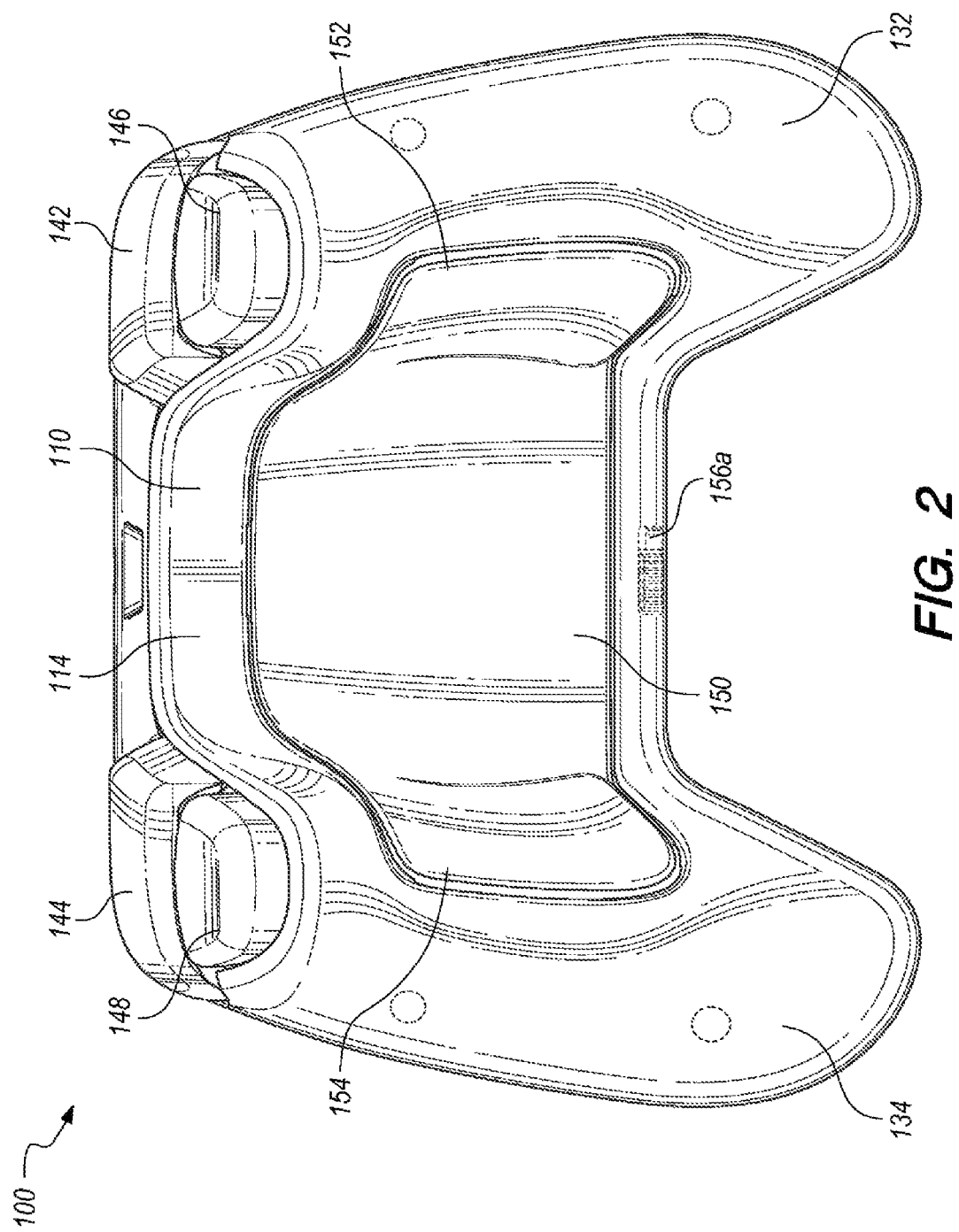
FIG. 2 is a back view of the hand-held video game controller of FIG. 1.

FIG. 2 is a back view of the hand-held video game controller 100, showing the back 114 of the controller body 110. The optional left upper trigger 142 and an optional right upper trigger 144 are also visible in the back view of FIG. 2, as are the left handle portion 132 and a right handle portion 134. The back 114 of the controller body 110 optionally may also include left and right under triggers 146, 148, which may be conveniently manipulated by the user's index or middle fingers during normal operation while the controller 100 is held in the hands of the user.

In the embodiment of FIG. 2, the back 114 of the controller body 110 may include a removable unitary back shell 150 that is preferably a single monolithic component (e.g. a single injection-molded plastic component). In the embodiment of FIG. 2, the removable unitary back shell 150 is optionally approximately centrally located between the left and right handle portions 132, 134. In certain embodiments, the removable unitary back shell 150 may be removable by a conventional latch mechanism component 156a. In certain alternative embodiments, the removable unitary back shell 150 may conventionally snap in or out of place on the controller body 110, by a conventional snap-in/snap-out interference of parts.

In certain embodiments, the unitary back shell 150 may be resilient, i.e. able to be moved or flexed from a rest position by the force of a user's finger, but returning to a rest position when not under load. In certain embodiments, the resilient nature of the unitary back shell 150 may enable it to selectively depress one or more underlying control buttons in response to forces or pressures selectively applied by the user (e.g. by the user's fingers other than the thumbs, most usually the user's middle, ring, or little fingers). For example, contiguous and unitary left and right wing portions 152, 154 may be readily accessible to the fingers of the user's left and right hands, respectively, during normal operation while the controller 100 is held in the hands of the user.

Figure 3:
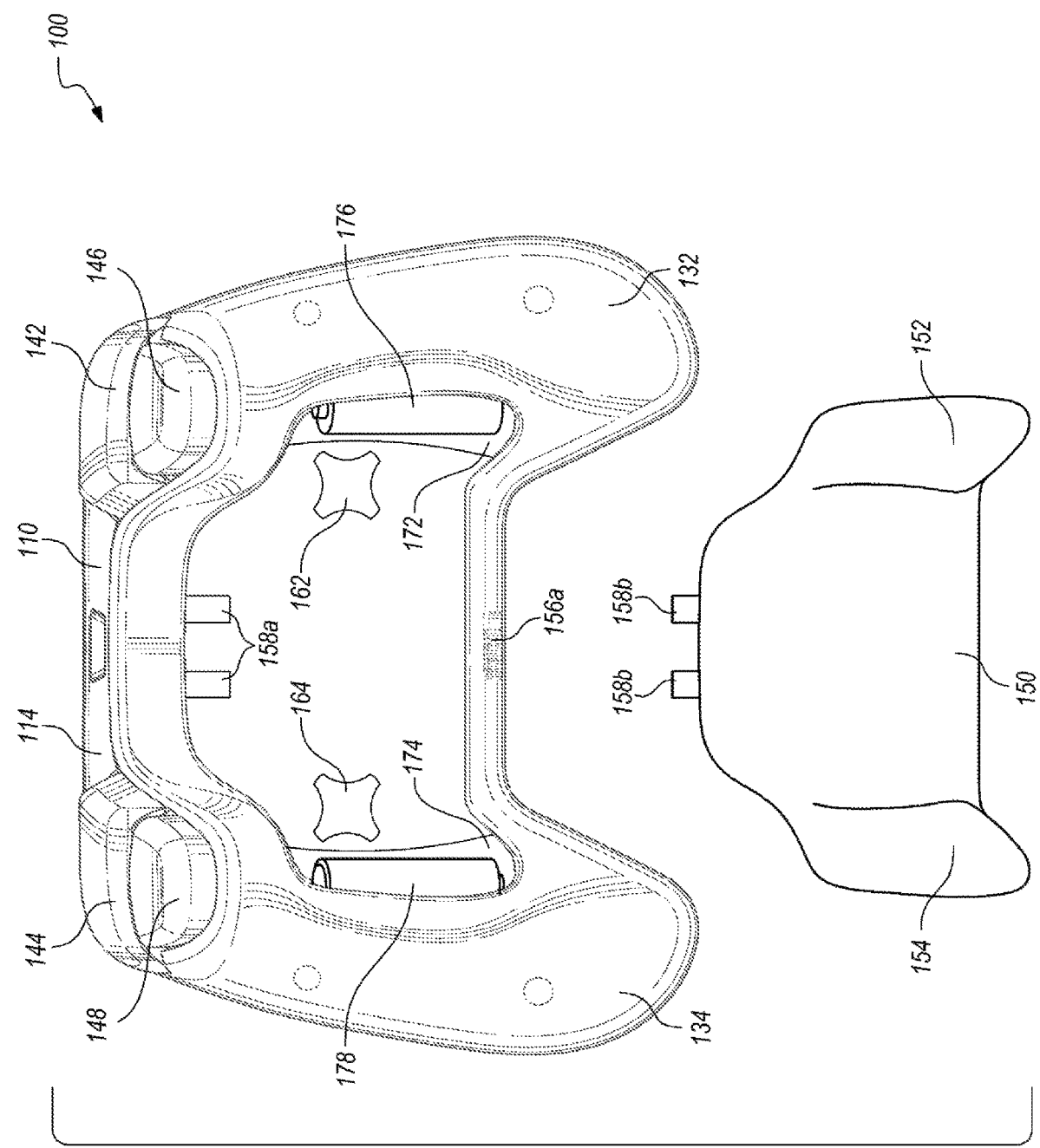
FIG. 3 is a back view of a hand-held video game controller of FIG. 2, with a unitary back shell removed to reveal underlying features.

FIG. 3 is a back view of the hand-held video game controller 100, with the unitary back shell 150 removed to reveal certain underlying features. In the embodiment of FIG. 3, the controller 100 includes left and right back control buttons 162, 164 that underlie the unitary back shell 150 when it is attached to the controller body 110. When the unitary back shell 150 is attached to the controller body 110 (e.g. by engagement of tabs 158b into tab receiving holes 158a), the user may selectively depress the left and right back control buttons 162, 164 by flexing the unitary back shell into contact therewith.

In the embodiment of FIG. 3, the controller 100 includes two battery compartments 172, 174 that are selectively accessible by removal of the removable unitary back shell 150. In this context, the battery compartments 172, 174 are considered to be selective accessible because they are accessible when the user removes the removable unitary back shell 150, but is not accessible when the user does not remove the removable unitary back shell 150.

Optionally but not necessarily, each of the battery compartments 172, 174 may receive one or more batteries (e.g. AA or AAA sized conventional batteries 176, 178, or another conventional battery configuration such as 9V batteries, etc.). As shown in FIG. 3, each of the two battery compartments 172, 174 is optionally but not necessarily disposed in (i.e. at least partially disposed in) a corresponding one of the left and right handle portions 132, 134, respectively.

Figure 4:
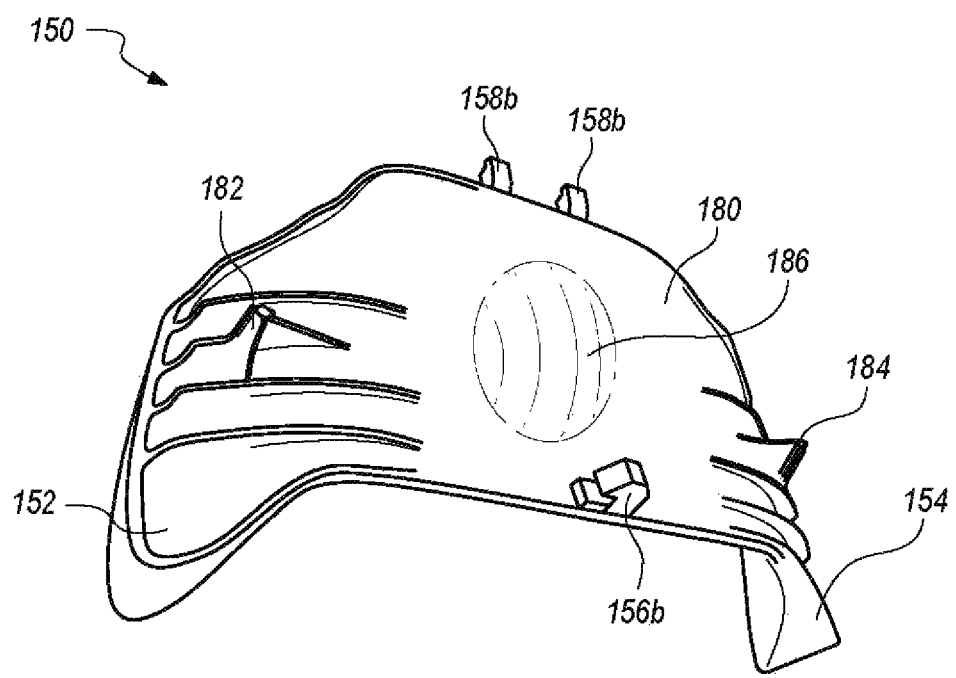
FIG. 4 is an underside perspective view of the unitary back shell of FIG. 3.

FIG. 4 is an underside perspective view of the unitary back shell 150. Now referring to FIGS. 3 and 4, the removable unitary back shell 150 has a shell underside 180 that optionally may include left and right rearward projections 182, 184 configured to contact the left and right back control buttons 162, 164, respectively. The shell underside 180 optionally may also include a latch component 156b that engages with the conventional latch component 156a to facilitate removal and reattachment of the removable unitary back shell 150.

In certain embodiments, the underside 180 of the removable unitary back shell 150 may further include a rearward fulcrum bulge 186 disposed between the left and right rearward projections 182, 184. For example, the rearward fulcrum bulge 186 optionally may be approximately centrally located between left and right edges of the removable unitary back shell 150. In certain embodiments, the rearward fulcrum bulge 186 preferably may be in contact with the controller body 110 when the unitary back shell 150 is attached thereto. In such embodiments, the unitary back shell 150 may optionally rock or flex about the rearward fulcrum bulge 186, so that the left and right rearward projections 182, 184 can selectively depress the underlying left and/or right back control buttons 162, 164, respectively, in response to forces or pressures selectively applied by the user.

Figure 5:
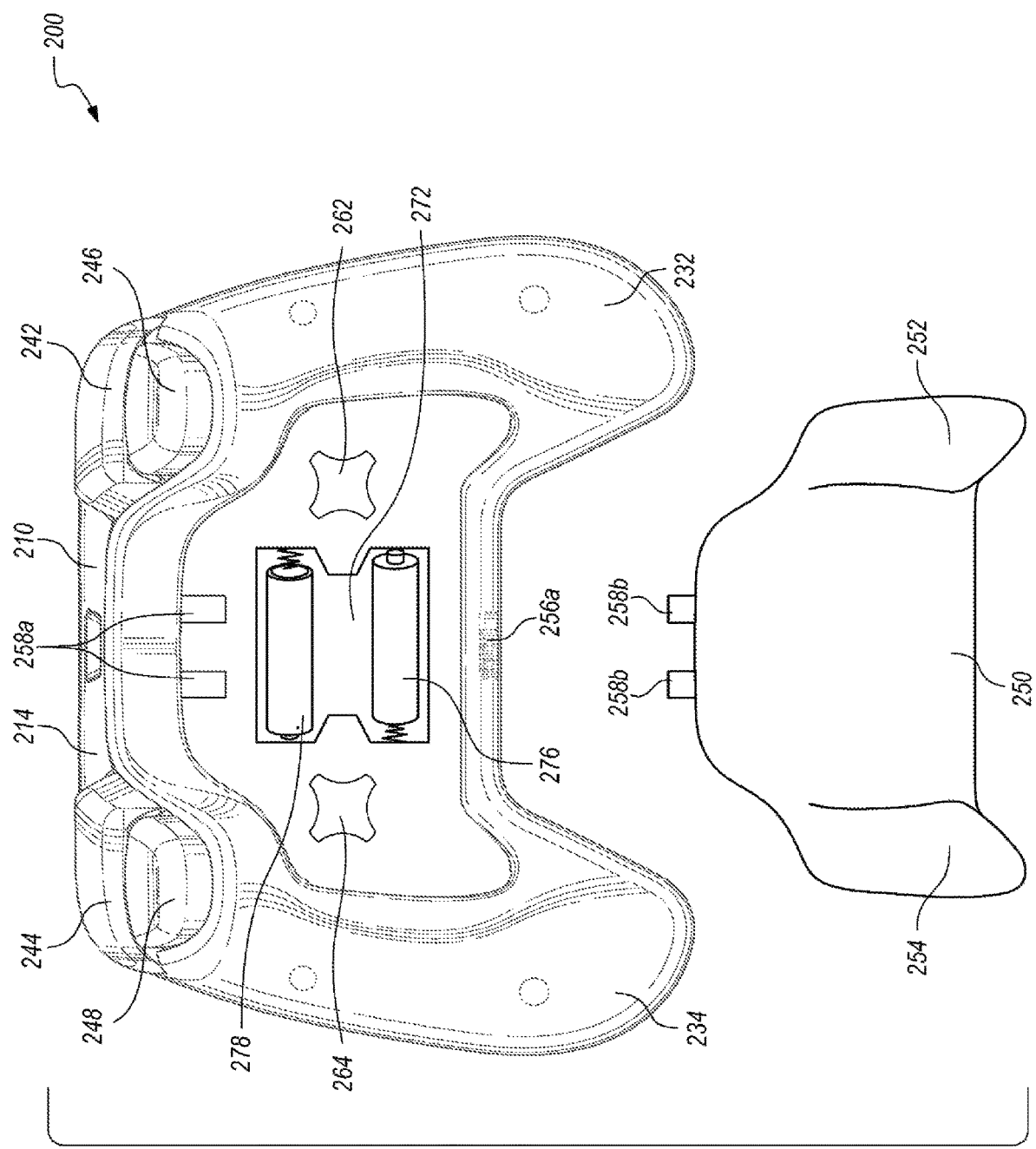
FIG. 5 is a back view of a hand-held video game controller according to another embodiment of the present invention, with a unitary back shell removed to reveal underlying features.

FIG. 5 is a back view of a hand-held video game controller 200 according to another embodiment of the present invention, with a unitary back shell 250 removed to reveal underlying features. The game controller 200 may include a controller body 210 having a back 214. The controller 200 optionally may include left and right upper triggers 242, 244, and optional left and right under triggers 246, 248. These triggers may be located so as to be conveniently manipulated by the user's index or middle fingers during normal operation while the controller 200 is held in the hands of the user.

In the embodiment of FIG. 5, the removable unitary back shell 250 preferably may be a single monolithic component (e.g. a single injection-molded plastic component), and optionally may be approximately centrally located between left and right handle portions 232, 234. In certain embodiments, the removable unitary back shell 250 may be removable by a conventional latch mechanism component 256a. In certain alternative embodiments, the removable unitary back shell 250 may conventionally snap in or out of place on the controller body 210, by a conventional snap-in/snap-out interference of parts.

In the embodiment of FIG. 5, the controller 200 includes left and right back control buttons 262, 264 that underlie the unitary back shell 250 when it is attached to the controller body 210. When the unitary back shell 250 is attached to the controller body 210 (e.g. by engagement of tabs 258b into tab receiving holes 258a), the user may selectively depress the left and right back control buttons 262, 264 by flexing the unitary back shell into contact therewith.

In certain embodiments, the unitary back shell 250 may be resilient, i.e. able to be moved or flexed from a rest position by the force of a user's finger, but returning to a rest position when not under load. In certain embodiments, the resilient nature of the unitary back shell 250 may improve its ability to selectively depress one or more of the underlying control buttons 262, 264, in response to forces or pressures selectively applied by the user (e.g. by the user's fingers other than the thumbs, most usually the user's middle, ring, or little fingers). For example, contiguous and unitary left and right wing portions 252, 254 may be readily accessible to the fingers of the user's left and right hands, respectively, during normal operation while the controller 200 is held in the hands of the user.

In the embodiment of FIG. 5, the controller 200 may include a single battery compartment 272 that is selectively accessible by removal of the removable unitary back shell 250. In this context, the battery compartment 272 is considered to be selective accessible because it is accessible when the user removes the removable unitary back shell 250, but is not accessible when the user does not remove the removable unitary back shell 250.

As shown in the FIG. 5, the battery compartment 272 optionally may be approximately centrally located between the left and right handle portions 232, 234, and the battery compartment 272 may underlie the removable unitary back shell 250. Optionally but not necessarily, the battery compartment 272 may receive one or more batteries (e.g. conventional AA or AAA sized batteries 276, 278, or a single 9V battery, etc.).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A hand-held video game controller, comprising:
 a controller body having a front and a back that is opposite the front;
 a plurality of thumb controls disposed on the front of the controller body;
 a unitary back shell removably coupled to the back of the controller body, the unitary back shell including an underside that includes:
  a first projection extending from a left portion of the underside;
  a second projection extending from a right portion of the underside; and
  a fulcrum bulge disposed between the first projection and the second projection;
 a first control button within the controller body and underlying the unitary back shell underneath the first projection;
 a second control button within the controller body and underlying the unitary back shell underneath the second projection,
 wherein the unitary back shell is configured to rock about the fulcrum bulge in response to force applied to the unitary back shell causing at least one of the first projection to depress the first control button or the second projection to depress the second control button; and
 at least one battery compartment that is accessible by removing the unitary back shell.

2. The hand-held video game controller of claim 1, wherein the at least one battery compartment underlies the unitary back shell.

3. The hand-held video game controller of claim 1, wherein the unitary back shell is a single monolithic component.

4. The hand-held video game controller of claim 1, wherein the unitary back shell is removably coupled to the controller body via a latch mechanism.

5. The hand-held video game controller of claim 1, wherein the controller body includes a left handle portion and a right handle portion, and the unitary back shell is centrally located between the left handle portion and the right handle portion.

6. The hand-held video game controller of claim 1, wherein the fulcrum bulge is in contact with the controller body when the unitary back shell couples to the back of the controller body.

7. A hand-held video game controller, comprising:
a controller body having a front and a back that is opposite the front;
a plurality of thumb controls disposed on the front of the controller body;
a unitary back shell removably coupled to the back of the controller body, the unitary back shell including an underside that includes:
a first projection extending from a left portion of the underside;
a second projection extending from a right portion of the underside; and
a fulcrum disposed between the first projection and the second projection;
a first control button within the controller body and underlying the unitary back shell underneath the first projection;
a second control button within the controller body and underlying the unitary back shell underneath the second projection,
wherein the unitary back shell is configured to rock about the fulcrum to selectively engage the first projection with the first control button or the second projection with the second control button in response to external pressure applied to the unitary back shell at a left side of the unitary back shell or a right side of the unitary back shell; and
at least one battery compartment that at least partially underlies the unitary back shell.

8. The hand-held video game controller of claim 7, wherein the unitary back shell is a single monolithic component.

9. The hand-held video game controller of claim 8, wherein the unitary back shell is an injection-molded plastic component.

10. A hand-held video game controller, comprising:
a controller body having a front and a back;
a unitary back shell removably coupled to the back of the controller body, the unitary back shell including an underside that includes:
a first projection projecting from a left portion of the underside;
a second projection projecting from a right portion of the underside; and
a fulcrum bulge disposed between the first projection and the second projection, wherein the fulcrum bulge is in contact with the controller body when the unitary back shell is coupled to the back of the controller body;
a first control within the controller body and underlying the unitary back shell underneath the first projection;
a second control within the controller body and underlying the unitary back shell underneath the second projection,
wherein the unitary back shell is configured to rock about the fulcrum bulge in response to force applied to at least one of a left side of the unitary back shell or a right side of the unitary back shell to cause at least one of the first projection to contact the first control or the second projection to contact the second control; and
at least one battery compartment that at least partially underlies the unitary back shell.

11. The hand-held video game controller of claim 10, wherein the controller body includes a left handle portion and a right handle portion.

12. The hand-held video game controller of claim 11, wherein the unitary back shell is centrally located between the left handle portion and the right handle portion.

13. The hand-held video game controller of claim 11, wherein the at least one battery compartment comprises a first battery compartment disposed with the left handle portion and a second battery compartment disposed within the right handle portion.

14. The hand-held video game controller of claim 11, wherein the at least one battery compartment underlies the unitary back shell and is approximately centrally located between the left handle portion and the right handle portion.

15. The hand-held video game controller of claim 10, wherein the unitary back shell is a single monolithic component.

16. The hand-held video game controller of claim 15, wherein the unitary back shell is an injection-molded plastic component.

17. The hand-held video game controller of claim 10, wherein the unitary back shell removable couples to the back of the controller body via a latch mechanism.

18. The hand-held video game controller of claim 10, wherein the controller body includes an injection-molded plastic component.

19. The hand-held video game controller of claim 10, wherein the fulcrum bulge is approximately centrally located between a left edge and a right edge of the unitary back shell.

20. The hand-held video game controller of claim 10, wherein:
the first control comprises a first depressible button;
the second control comprises a second depressible button;
the first projection is configured to depress the first depressible button; and
the second projection is configured to depress the second depressible button.

\* \* \* \* \*